Dec. 5, 1967  E. R. BROWN  3,356,071
CHROMATOGRAPHIC STREAKING MACHINE
Filed June 15, 1965  2 Sheets-Sheet 1
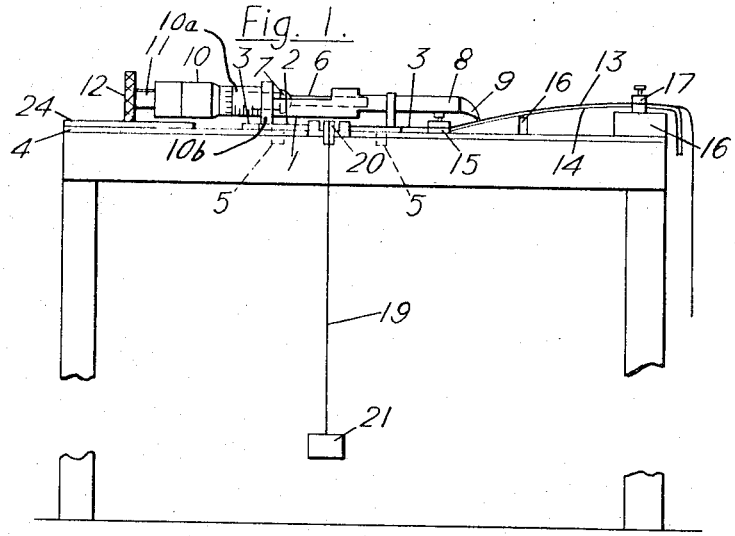
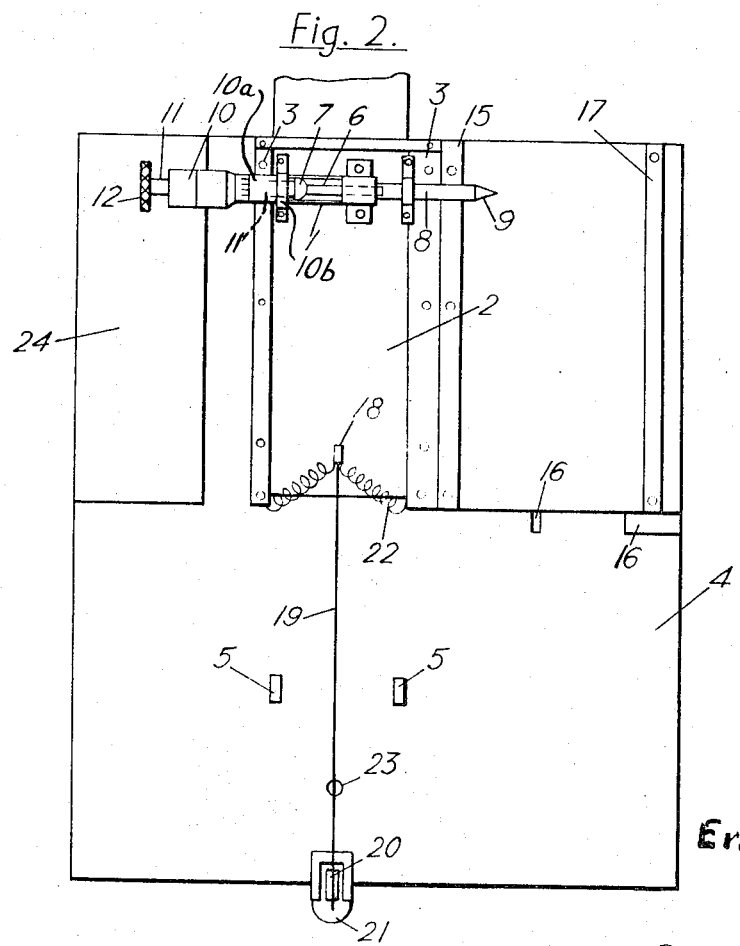
Eric R. Brown
Inventor
By Elmer J. Lawson
Attorney

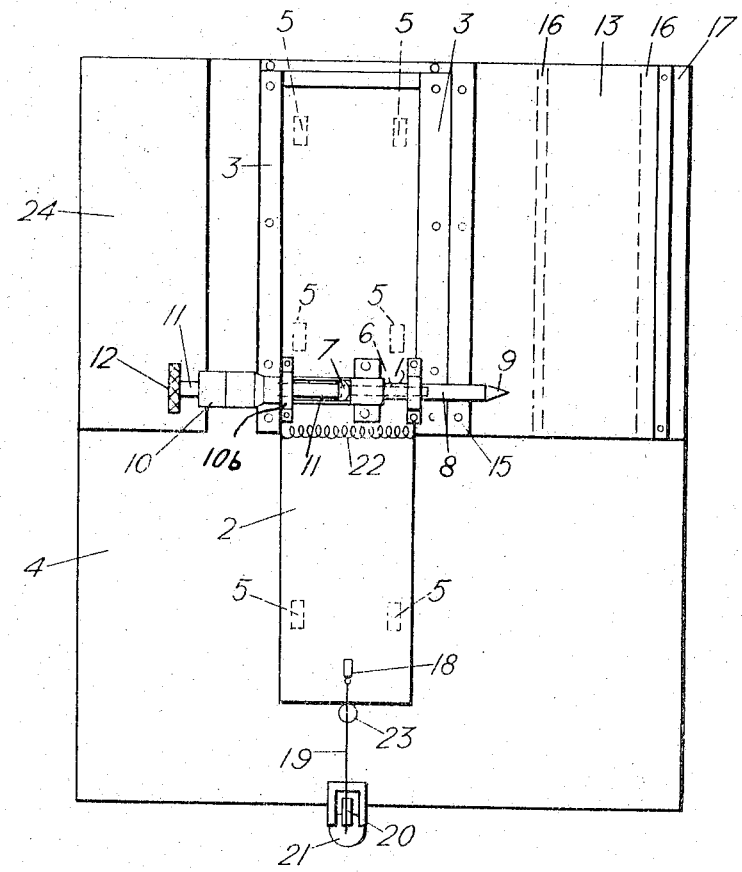

United States Patent Office 3,356,071
Patented Dec. 5, 1967

3,356,071
CHROMATOGRAPHIC STREAKING MACHINE
Eric R. Brown, Newcastle-upon-Tyne, England, assignor to Sterling Drug Inc., New York, N.Y., a corporation of Delaware
Filed June 15, 1965, Ser. No. 464,024
Claims priority, application Great Britain, June 17, 1964, 25,153/64
3 Claims. (Cl. 118—410)

ABSTRACT OF THE DISCLOSURE

A chromatographic streaking device for applying a continuous line of liquid to a chromatographic material, comprising a carriage guided in guide means and having a hollow needle thereon through which liquid is ejected from a syringe having a piston slidable in a uniform bore therein. A drive wheel is connected to the piston by a connecting rod through a micrometer measuring means so that when the carriage moves, the piston head is moved in proportion to the amount of rotation of the drive wheel.

---

The present invention relates to a device for applying an even line of liquid to a chromatographic material.

Chromatograms are normally obtained by applying spots of the liquid to be treated to a suitable chromatographic material. However, there are certain advantages to be obtained by applying the liquid to be tested in the form of a continuous line, the resulting bands being more easily assessed quantitatively by means of various scanning devices than a diffused spot. However, it is difficult to obtain a narrow, even line of liquid, particularly if the hollow needle or other dispensing means from which the liquid is being ejected is accelerating across the surface of the chromatographic material.

The device of the present invention is particularly adapted to apply a narrow, even, continuous line of liquid to a chromatographic material, the quantity of liquid being ejected varying directly with the length of the continuous line obtained and being unaffected by the rate of travel of the dispensing means across the sheet of chromatographic material.

The present invention accordingly provides a chromatographic streaking device for applying to a surface a continuous line of liquid which comprises a syringe connected to a hollow needle through which liquid may be ejected, the syringe comprising a tubular portion of uniform bore for holding the liquid adjacent to the needle connection, a piston head mounted in the tubular portion, and a connecting rod making contact at one end with the piston head and rigidly connected at the other end to the centre of a drive wheel, the connecting rod and drive wheel being so mounted through a screw-threaded connection upon a movable carriage that rotation of the drive wheel moves the connecting rod axially with respect to the tubular portion to actuate the piston head, the syringe being mounted upon said movable carriage; it will be seen that by moving the movable carriage across a surface so that rotation of the drive wheel across the surfaces causes the connecting rod to move the piston head along the tubular portion of the syringe thus causing liquid to be ejected through the hollow needle on to a collecting surface, the volume of liquid ejected will be directly proportional to the number of revolutions of the drive wheel. The circumference of the drive wheel and the pitch of the screw-threaded connection will be so related that rotation of the wheel causes ejection of an appropriate amount of liquid per unit length of continuous line traced on chromatographic material forming the collecting surface. The amount of liquid ejected per unit length of the collecting surface can be varied by altering the diameter of the drive wheel and re-positioning the surface on which it runs.

The piston head and connecting rod may be formed of any rigid material, suitably a metallic material such as an aluminium alloy or mild steel. The syringe and hollow needle may also be formed of any rigid material but are preferably formed of glass. The wheel may suitably be formed by mounting a rubber ring on a circular metal disc to the centre of which the connecting rod is attached. The connecting rod and drive wheel may form part of a micrometer gauge type of mounting in which these two elements are mounted upon a fixed, externally screw-threaded, tubular element which is carried upon the movable carriage; graduations on the cap and tubular elements facilitate the calculation of the amount of liquid ejected during the traverse of the needle over the collecting surface.

The construction and operation of a specific embodiment of the device of the present invention will now be described with reference to FIGURES 1 to 3.

FIGURE 1 is a vertical section through a device according to the invention mounted upon the top surface of a table;

FIGURE 2 is a top view of the device illustrated in FIGURE 1 in the starting position, and FIGURE 3 is a top view partly in sectional elevation of the device, illustrated in FIGURES 1 and 2, in the finishing position.

Referring to the figures, the syringe is mounted in the middle of a carriage in the form of a board 2 which is slidably mounted between two guide bars 3 fixed to the surface of the table 4 and rests on roller bearings 5 mounted in holes in the surface of the table. The syringe consists of a tubular portion 1 having a circular cross-section, in which is set a piston 6 terminating in a head 7, and a barrel 8 leading to a hollow glass needle head 9. The inner surface of the cylindrical micrometer head 10 is formed with a screw-thread (not visible) which co-operates with a complementary screw-thread (not visible) on the surface of the complementary tubular element 10a of the micrometer head. The micrometer head and complementary tubular element are mounted on the board 2 by means of strap 10b. The connecting rod 11 makes contact with the centre of the piston head 7 at one end and is connected to the centre of the wheel 12 at the other end through the micrometer head 10. The needle head 9 is bent downwards and rests on a sheet of chromatographic paper 13 which paper rests on a foam rubber or plastic sheet 14 supported by supports 16. The chromatographic paper is clamped along one edge by a fixing bar 15 and kept taut by means of tensioning bar 17. One end of the board 2 has a hook 18 to which is attached a wire 19 which passes over a pulley 20 and is attached at its other end to a weight 21 which hangs freely over the edge of the table. There is a spring 22 fixed at each end to one of the guide bars 3 which, when the device is in the starting position shown in FIGURE 2, hooks over the hook 18. There is a stop 23 fixed to the surface of the table with which that end of the board 2 to which the wire is attached comes in contact at the finishing position illustrated in FIGURE 3. The wheel 12 rests on the surface of a board 24 fixed to the surface of the table.

The device is held in the starting position by a clamp (not shown) fixed to the table 4 and clamping the board 2. When the clamp is released, the initial movement of the board 2 through the guide bars 3 and over the roller bearings 5 is assisted by the action of the spring 22 after which the movement is continued by the action of gravity on the freely-hanging weight 21. The movement is thus an acceleration. As the board 2 is pulled across the surface of the table, the wheel 12 rolls over the board 24 thus rotating the connecting rod 11 through its connection to the cylindrical micrometer head 10, each revolution of the wheel causing the connecting rod to move further into the tubular portion and thus moving the piston head and piston towards the needle connection by the length of one pitch of the screw-thread, thus ejecting a predetermined amount of liquid through the needle head on to the chromatographic paper. As the needle head moves the same distance as the wheel, the amount of liquid ejected varies directly with the distance moved by the needle head across the chromatographic paper and an even, continuous line is obtained, the breadth of which depends upon but is not necessarily equal to the size of the aperture in the needle head. The volume of solution placed on the paper per unit length may be calculated from the micrometer reading and from the cross-section of the tubular portion 1 of the syringe.

After applying the line of solution on to the paper, the margins (say ½-inch to 1 inch) of the chromatographic paper may be trimmed off to remove any irregularities due to the starting and stopping operations.

For application to thin layer chromatography in which the medium to be streaked consists of a glass plate (or similar rigid or semi-rigid material) coated with a layer of adsorbent, the foam sheet 14 and support 16 are removed and replaced by a rectangular rigid metal plate provided with levelling screws at each corner. The thin layer chromatographic plate is then placed upon the rigid metal plate and adjusted by means of the levelling screws so that the needle tip touches, but does not scrape, the coating of the thin layer plate. A light flexible needle can be used instead of a glass (or rigid metal) one to lessen the likelihood of scraping off the adsorbent. The propulsion of the syringe carriage can then be effected by means of the falling weight or the falling weight can be dispensed with and the carriage carefully propelled by hand. Alternatively, the carriage can be positively driven by mechanical means such as an electric motor.

I claim:

1. A chromatographic streaking device for applying to a surface a continuous line of liquid, said device comprising a carriage, guide means in which said carriage is guided for movement, a hollow needle through which liquid can be ejected, a syringe on one end of which the hollow needle is mounted and comprising a tubular portion having a uniform bore and opening into said hollow needle for holding the liquid for feeding to the hollow needle, a piston head mounted in said uniform bore, and a connecting rod having one end in contact with said piston head, a drive wheel, micrometer measuring means mounted on said carriage and being coupled to said connecting rod and said drive wheel for moving said connecting rod when said drive wheel rotates, said drive wheel, connecting rod and micrometer measuring means being in coaxial alignment, a fixed surface against which said drive wheel is engaged and along which said drive wheel rolls for rotating the drive wheel, and sheet holding means adjacent said hollow needle for holding a sheet along which said hollow needle moves and deposits liquid when said carriage moves.

2. A chromatographic streaking device as claimed in claim 1 and further comprising driving means coupled to said carriage for driving said carriage along said guide means.

3. A chromatographic streaking device as claimed in claim 2 in which said drive means comprises a line attached to said carriage, a pulley over which said line runs, and a weight on the end of said line, and initial accelerating means comprising a spring extending across the path of the carriage and a projection on said carriage engageable with said spring, whereby when said carriage is moved to the starting position, the projection engages and stretches said spring, and on release of the carriage, the spring exerts a force on the projection in the direction of movement of the carriage.

References Cited

UNITED STATES PATENTS

| | | | |
|---|---|---|---|
| 1,749,326 | 3/1930 | Dirkes et al. | 15—548 |
| 1,994,238 | 3/1935 | Barden | 15—548 |
| 2,412,295 | 12/1946 | Shaffer | 222—26 |
| 2,766,136 | 10/1956 | Gray. | |

FOREIGN PATENTS 891,765   12/1943   France.

CHARLES A. WILLMUTH, *Primary Examiner.*

J. P. McINTOSH, *Assistant Examiner.*